US012651829B2

(12) United States Patent
Svensson et al.

(10) Patent No.: US 12,651,829 B2
(45) Date of Patent: Jun. 9, 2026

(54) ANTENNA ARRANGEMENT

(71) Applicant: SAAB AB, Linköping (SE)

(72) Inventors: Bengt Svensson, Mölndal (SE); Anders Höök, Hindås (SE); Glenn Sjöberg, Gothenburg (SE); Daniel Sjöberg, Malmö (SE); Alexandros Pallaris, Lund (SE)

(73) Assignee: SAAB AB, Linköping (SE)

( * ) Notice: Subject to any disclaimer, the term of this patent is extended or adjusted under 35 U.S.C. 154(b) by 32 days.

(21) Appl. No.: 18/866,582

(22) PCT Filed: May 16, 2023

(86) PCT No.: PCT/SE2023/050482
§ 371 (c)(1),
(2) Date: Nov. 18, 2024

(87) PCT Pub. No.: WO2023/224540
PCT Pub. Date: Nov. 23, 2023

(65) Prior Publication Data

US 2025/0309524 A1 Oct. 2, 2025

(30) Foreign Application Priority Data

May 18, 2022 (SE) .................................... 2200055-8

(51) Int. Cl.
*H01Q 1/32* (2006.01)
*H01Q 1/42* (2006.01)
(Continued)

(52) U.S. Cl.
CPC ................. *H01Q 1/32* (2013.01); *H01Q 1/42* (2013.01); *H01Q 1/50* (2013.01); *H01Q 5/15* (2015.01); *H01Q 5/30* (2015.01); *H01Q 9/16* (2013.01)

(58) Field of Classification Search
CPC .. H01Q 1/32; H01Q 1/42; H01Q 1/50; H01Q 5/15; H01Q 5/30; H01Q 9/16;
(Continued)

(56) References Cited

U.S. PATENT DOCUMENTS

2007/0252775 A1 11/2007 Munk et al.
2014/0125543 A1 5/2014 Chen et al.
(Continued)

FOREIGN PATENT DOCUMENTS

WO 2020191605 A1 10/2020
WO 2021057907 A1 4/2021

OTHER PUBLICATIONS

International Search Report and Written Opinion mailed Jul. 12, 2023 for International Application No. PCT/SE2023/050482, 15 pages.
(Continued)

*Primary Examiner* — Seung H Lee
(74) *Attorney, Agent, or Firm* — Sage Patent Group

(57) ABSTRACT

The present disclosure relates to an antenna arrangement including a first antenna configured to operate within a first frequency band and a planar layer having an oblong conducting structure attached thereon, the conducting structure being arranged within an illumination-field of the first antenna. Further including a plurality of capacitive strips arranged on opposing longitudinal portions of the planar layer extending along a length of the conducting structure, the longitudinal portions being separated by the conducting structure.

16 Claims, 9 Drawing Sheets

(51) Int. Cl.
*H01Q 1/50* (2006.01)
*H01Q 5/15* (2015.01)
*H01Q 5/30* (2015.01)
*H01Q 9/16* (2006.01)

(58) Field of Classification Search
CPC ........ H01Q 5/385; H01Q 9/285; H01Q 1/521; H01Q 17/002; H01Q 21/28; H01Q 1/52; H01Q 5/00
See application file for complete search history.

(56) References Cited

U.S. PATENT DOCUMENTS

| | | | | |
|---|---|---|---|---|
| 2016/0111782 | A1 | 4/2016 | Alu et al. | |
| 2018/0269577 | A1 | 9/2018 | Kosaka et al. | |
| 2020/0028277 | A1 | 1/2020 | Watson | |
| 2021/0320413 | A1 | 10/2021 | Wu et al. | |
| 2022/0285858 | A1* | 9/2022 | Xiao | H01Q 1/246 |
| 2023/0335923 | A1* | 10/2023 | Aoki | H01Q 21/08 |
| 2024/0006772 | A1* | 1/2024 | Svensson | H01Q 5/40 |
| 2024/0332791 | A1* | 10/2024 | Tao | H01Q 9/40 |

OTHER PUBLICATIONS

Sun Hai-Han et al., "Suppression of Cross-Band Scattering in Multiband Antenna Arrays", IEEE Transactions of Antennas and Propagation, vol. 67, No. 4, Apr. 2019, 11 pages.

Extended European Search Report, European Patent Application No. 23808006.3, mailed Apr. 7, 2026, 11 pages.

* cited by examiner

ANTENNA ARRANGEMENT

CROSS-REFERENCE TO RELATED APPLICATIONS

This application is a 35 U.S.C. § 371 national stage application for International Application No. PCT/SE2023/050482, entitled “AN ANTENNA ARRANGEMENT”, filed on May 16, 2023, which claims priority to Swedish Patent Application No. 2200055-8, filed on May 18, 2022, the disclosures and contents of which are hereby incorporated by reference in their entireties.

TECHNICAL FIELD

The present disclosure relates to an antenna arrangement, a fixed installation comprising said antenna arrangement and a vehicle comprising said antenna arrangement. Further, the disclosure relates to a method for manufacturing a planar layer of said antenna arrangement.

BACKGROUND ART

Antennas are known in the art and used to convert free space radiating fields into alternating current or converting alternating current into free space radiating fields. Antennas can be described by their radiation patterns and by the type of antenna elements in the system.

There are different types of antenna arrangements adapted to different types of applications. For instance, there are more complex types of antenna arrangements that deploy a first and a second antenna working as a primary and a secondary antenna. In other types, there is an antenna that has to be compactly positioned in a small space such that wire structures (eg., cables) thereof or other cables are placed above/in front of the antenna i.e. being a co-located antenna arrangement. In these types of antenna arrangements, the antenna and the wire structure (which may be a second antenna) need to operate according to required standards.

Thus, it is desired to co-locate an antenna arrangement in this manner to optimize areas where the antenna arrangement is located, e.g., to minimize the size of a base-station antenna arrangement or to fit a radar system on a vehicle platform. In other words, high performance antenna arrangements, e.g. with electrically steered beams, would benefit from the ability to co-locate the antennas of said antenna arrangement and/or wires thereof to achieve a greater compactness and increased space-efficiency.

A problem with such co-located antenna arrangements is that the second antenna/wires in front of the first antenna can disturb the operation and/or the performance of the first antenna. Thus, hampering the performance of the antenna arrangement as such.

Accordingly, there is a need in the art for an antenna arrangement having a first antenna (may also be referred to as a primary antenna) and a second antenna/wires structures being placed in front of the first antenna, where the second antenna’s/wire structure’s disturbance of the operation or performance of the first antenna is removed or at least mitigated.

Further, there is also a need for such an antenna arrangement that is convenient and cost effective in terms of manufacturing. There is specifically a lack in the present art of how to improve a co-located antenna arrangement so to be able to provide an antenna arrangement that can operate without disturbance even though it has conductive structures (i.e. a wire structure or a second antenna) in its field of illumination.

Even though some currently known solutions work well in some situations it would be desirable to provide such an antenna arrangement that fulfils requirements related to improving the performance of the antenna arrangements comprising antennas having conductive structures in its field of illumination and/or providing such an antenna arrangement that is convenient and cheap to manufacture.

SUMMARY OF THE INVENTION

It is therefore an object of the present disclosure to provide an antenna arrangement, a fixed installation, a vehicle comprising such an antenna arrangement and a method for manufacturing a planar structure for such an antenna arrangement, which mitigate, alleviate or eliminate one or more of the deficiencies and disadvantages of currently known solutions.

This object is achieved by means of an antenna arrangement, a fixed installation, a method and a vehicle as defined in the appended claims.

The present disclosure is at least partly based on the insight that in situations where an antenna arrangement has an antenna that is co-located, i.e., when a second antenna/or any wire structure is placed in front of a first antenna, it is desirable that the second antenna/wire structure is electrically invisible or transparent to the first antenna. In other words, the antenna arrangement may achieve an improved performance if the first antenna can operate without any disturbance from the second antenna/wire structure.

The present disclosure relates to an antenna arrangement comprising a first antenna configured to operate within a first frequency band and a planar layer having an oblong conducting structure attached thereon, the conducting structure being arranged within an illumination-field of the first antenna. Further, the antenna arrangement comprises a plurality of capacitive strips arranged on opposing longitudinal portions of said planar layer extending along a length of said conducting structure, the opposing longitudinal portions being separated by said conducting structure.

A benefit of the antenna arrangement according to the present disclosure is that the first antenna can operate with maintained functionality and minimal disturbance from the wire structure. In addition, the arrangement provides a compact arrangement that is convenient to manufacture. Thus, the disclosure may also provide a benefit of being able to cancel the scattering of said conducting structure. The conducting structure may be in electrical connection with the antenna arrangement, or in operational connection with the antenna arrangement, thus it may be any a functional part of said antenna arrangement (e.g. a transmission line/cable or a second antenna).

The conducting structure may be a wire structure, wherein the wire structure is one of a lightning protection wire, electrical cable, RF transmission lines and a pitot tube. Thus, the conducting structure may be a functional part of the antenna arrangement. The planar layer may be a substrate, e.g. a printed circuit board.

Thus, conducting structures of said antenna arrangement could be arranged within the illumination field of said first antenna and be “invisible”.

The conducting structure may be a dipole antenna element, preferably a half-wavelength dipole antenna element with a centre feed point, the dipole antenna element being configured to operate within a second frequency band, wherein the first frequency band is greater than the second frequency band. The centre feed point may be located at a gap in a centre part of the conducting structure, thus the gap may be connected to a generator.

Accordingly, the conducting structure may be a wire structure, an antenna or any other suitable type of conducting structure. Accordingly, the conducting structure is not limited to be a wire structure or antenna.

A lowest frequency of the first frequency band is at least two times greater than a highest frequency of the second frequency band. Preferably, its at least 3-10 greater than the second frequency band.

The length of said conducting structure may be parallel to a polarization direction of said first antenna. This orientation normally causes large disturbance to the field of the first antenna. However, using capacitive strips adjacent to the conducting structure will cancel out the disturbance from the conducting structure relative the first antenna. Accordingly, the capacitive strips may be configured to cancel disturbance from the conductive structure relative the first antenna.

A distance between outer edges of opposing capacitive strips is equal to or less than a wavelength/3, λ/3 at a highest frequency of the first frequency band, preferably λ/4. Thus, the structure may be compact in design while maintaining functionality.

The conductive structure may be in the form of a meander line extending in a zigzag form, a square-waveform, a sinusoidal-waveform or a saw-tooth form. An advantage of this is that it allows for more control of the inductance of the conductive structure-thereby allowing for reduced scattering.

The meander line may be a tapered meander line comprising meander periods, the meander periods at central portions of said meander line being greater than meander periods at edge portions of said meander line. An advantage of this is that it reduces the losses due to the currents arising from an operating frequency of said second antenna, these currents being strongest at the centre. In addition, it provides reduction of conductive losses arising from the conductive structure.

The planar layer may have a thickness being equal to or smaller than wavelength/5, λ/5 at a highest frequency of the first frequency band. Thus, being fully functioning while compact in construction. Thus, the substrate thickness is configured to give maximum transmission for said first frequency band.

The plurality of capacitive strips may be further arranged on opposing lateral portions of said planar layer, extending along a width of said conducting structure. The lateral portions may be separated by the length of the conducting structure. A benefit of this is enhanced control of the higher order resonances of the second antenna. The capacitive strips at said lateral portions may be in contact with said conducting structure for optimized functioning.

Each capacitive strip of the plurality of capacitive strips may comprise a pre-configured period, the period being defined by a sum of a length of one of said capacitive strips of said plurality of capacitive strips and a gap from a first edge of said capacitive strip to a second edge of an adjacent capacitive strip said period being pre-arranged to provide a capacitance of the plurality of capacitive strips that matches an inductance of said conducting structure. Thus allowing for cancellation so to prevent disturbances of the conducting structure to the first antenna.

The first antenna may be enclosed/covered by a radome, wherein the radome is formed by said planar layer.

The planar layer may be a multi-layer having a plurality of planar layers (e.g. formed by dielectric substrates as such) stacked on top of each other. Such a construction provides the advantage of reducing an angular dependence. The distance between adjacent layers may be 0.5-2 mm or <λ/6, and further, the whole multi-layer structure may have a thickness being equal or less than about λ/2, half a wavelength in size. In other words, the planar layer may be combined with a plurality of additional dielectric layers which can positively affect angle of arrival dependence—thus allowing for functioning at a greater range of angles. Moreover, the disclosure may comprise multiple/additional layers of capacitive strips surrounding the conducting structure 4 i.e. arranged on longitudinal portions of said planar layer.

The present disclosure also provides a fixed installation comprising the antenna arrangement according to any aspect herein. The fixed installation may be a base station.

The present disclosure also provides a vehicle comprising the antenna arrangement according to any aspect herein. The vehicle may be an aerial vehicle e.g., an aircraft, a ground vehicle or a ship.

There is also provided a method of manufacturing a planar layer for the antenna arrangement according to aspect herein comprising the steps of:

- providing said planar layer having an oblong conducting structure attached thereon;
- etching a plurality of capacitive strips on opposing longitudinal portions of said conducting structure extending along a length of said conducting structure.

Further, in some aspects of the method, prior to the step of etching, the method may comprise the steps of:

- determining a period for each capacitive strip of the plurality of capacitive strips;
- determining a distance between adjacent capacitive strips in the direction of the length.

The period and the distance being determined based on an inductance of said oblong conducting structure at said first frequency band of said first antenna. It should be noted that the method may also comprise determining a shape of the capacitive strips.

The method provides the advantage of allowing for a convenient manufacturing with few method steps and low-cost.

In some aspects of the disclosure herein, there is provided a use of a planar layer having an oblong conducting structure attached thereon for being arranged within an illumination-field of a first antenna, the planar layer comprising a plurality of capacitive strips arranged on opposing longitudinal portions of said planar layer extending along a length of said conducting structure, the longitudinal portions being separated by said conducting structure.

In other aspects of the disclosure herein, there is provided a planar layer arranged to be within an illumination-field of a first antenna, the planar layer having an oblong conducting structure attached thereon, wherein a plurality of capacitive strips are arranged on opposing longitudinal portions of said planar layer extending along a length of said conducting structure, the longitudinal portions being separated by said conducting structure. Such a planar layer may be a planar layer according to any aspect of the planar layer disclosed herein.

BRIEF DESCRIPTION OF THE DRAWINGS

In the following, the disclosure will be described in a non-limiting way and in more detail with reference to exemplary embodiments illustrated in the enclosed drawings, in which.

DETAILED DESCRIPTION

Figure 1:
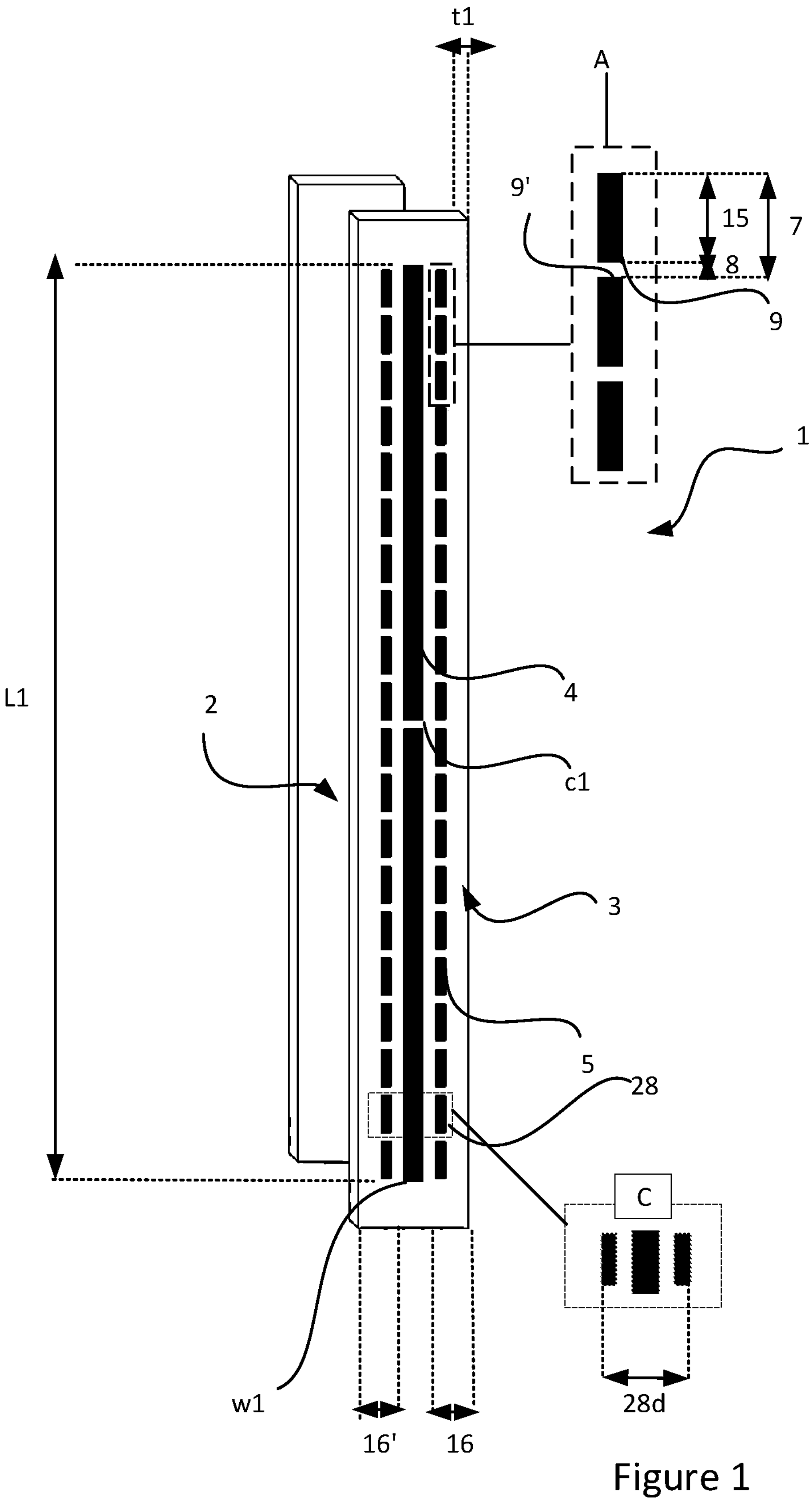
FIG. 1 illustrates a top objective view of an antenna arrangement in accordance with some aspects of the disclosure herein, further enlarged portions A and C are shown in FIG. 1.

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided disclosure, it will be apparent to one skilled in the art that the embodiments in the present disclosure may be realized without these details. In other instances, well known constructions or functions are not described in detail, so as not to obscure the present disclosure.

In the following description of example embodiments, the same reference numerals denote the same or similar components.

FIG. 1 illustrates antenna arrangement 1 comprising a first antenna 2 configured to operate within a first frequency band (which may be 7-13 Ghz), a planar layer 3 (such as a printed circuit board) having an oblong conducting structure 4 attached thereon, the conducting structure 4 (and the planar layer 2 as such) being arranged within an illumination-field of the first antenna 2. Further, the arrangement 1 comprises a plurality of capacitive strips 5 arranged on opposing longitudinal portions 16, 16' of said planar layer 3 extending along a length L1 of said conducting structure 4, the longitudinal portions 16, 16' being separated by said conducting structure 4. As illustrated in FIG. 1, the capacitive strips 5 may be separated from the conducting structure 4, in other words, not being in contact with said conducting structure 4.

It should be noted that the capacitive strips 5 may have different geometrical implementations, for example each strip 5 may have the form of a rectangular strip, rectangular or oval loop, dogbone (H-shape), or interleaved fingers.

The conducting structure 4 may be a wire structure, the wire structure being one of a lightning protection wire, electrical cable, transmission line and a pitot tube.

As further illustrated in FIG. 1, the conducting structure 4 may be a dipole antenna element, preferably a half-wavelength dipole antenna element with a centre feed portion c1 (see FIG. 2), the dipole antenna element being configured to operate within a second frequency band, wherein the first frequency band is greater than the second frequency band. The first frequency band may be 7-13 Ghz and the second frequency band may be 0.5-3 Ghz. In some aspects a lowest frequency of the first frequency band is at least two times greater than a highest frequency of the second frequency band. In other aspects, said lowest frequency of the first frequency band is 3-10 times greater than a highest frequency of the second frequency band.

The capacitive strips 5 may extend at least along the total length L1 of the conducting structure 4. Further, the term "plurality of capacitive strips 5" may refer to being at least 3 capacitive strips, preferably 5-10 capacitive strips, or more than 10 capacitive strips 5 on each side of said conducting structure 4. The length L1 of the conducting structure 4 may be equal to or greater than the length of the first antenna (in the direction of L1).

The first antenna 2 may be an X-band antenna, e.g. an X-band antenna and the conducting structure 4 may be a secondary surveillance radar (SSR) antenna—the antennas may be radar antennas. In some cases, said antennas need to, according to regulation standard, have the same polarization. Thus, the first and second antenna 2, 4 may have the same polarization. This usually causes disturbances/scattering, however the present disclosure may reduce said scattering by the antenna arrangement 1 provided herein. This provides advantages especially for active electronically scanned array (AESA) antenna arrangements (e.g. AESA radars) in which such disturbances are not tolerated and the side lobe requirement is high.

Figure 9:
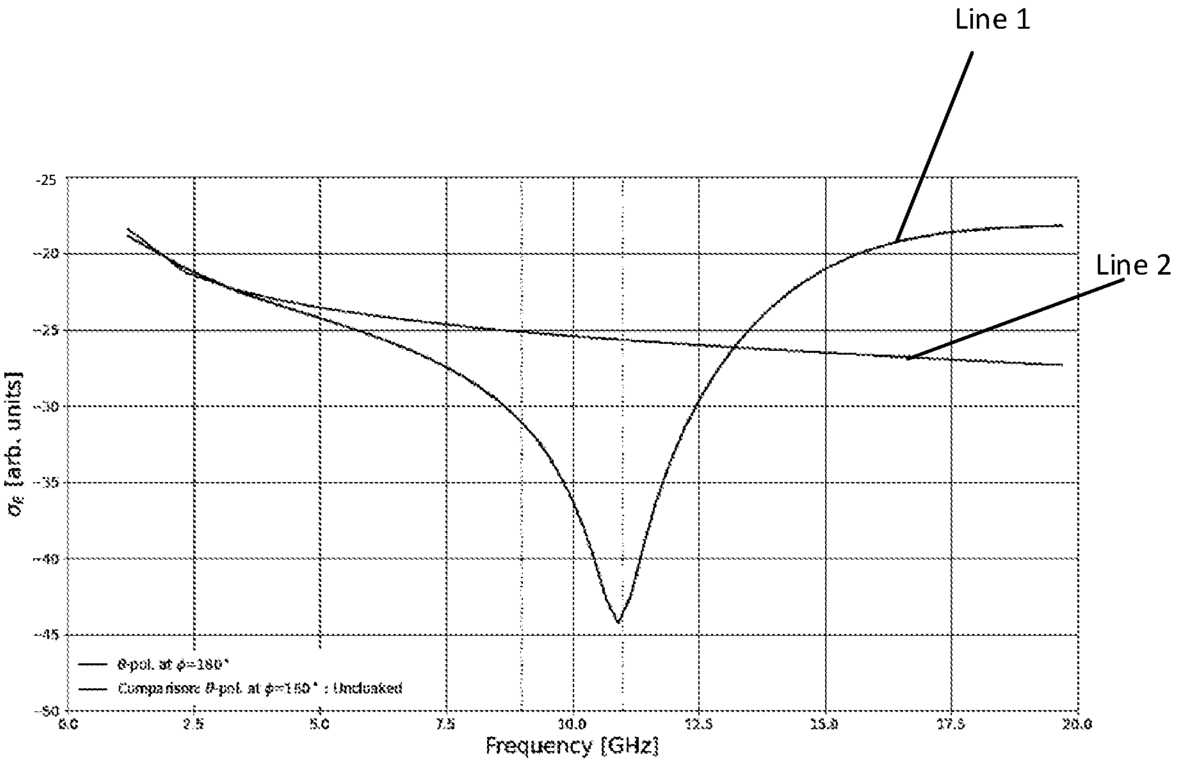
FIG. 9 illustrates a graph depicting a comparison of extinction cross section for a planar layer of an antenna arrangement of the present disclosure compared to a conventional antenna arrangement.

The disclosure may provide about 15 dB reduced extinction cross section (which is a measure of the disturbance to the X-band function) compared to conventional solutions when said first frequency band operates at 10 GHz (this is further shown in FIG. 9).

FIG. 1 further illustrates that the planar layer 3 may have a thickness t1 being equal to or smaller than wavelength/5, $\lambda/5$, of a highest frequency of the first frequency band. The thickness t1 may be in the range of 0.1-0.5 mm.

Moreover, FIG. 1 illustrates, in enlarged section A, that each capacitive strip 5 of the plurality of capacitive strips 5 comprises a pre-configured period 7. The period 7 may be defined by a sum of a strip-length 15 of one of said capacitive strips 5 of said plurality of capacitive strips 5 and a strip-gap 8 between a first edge 9 of said capacitive strip to an adjacent second edge 9' of an adjacent capacitive strip 5. The period 7 may be pre-arranged to provide a capacitance of the plurality of capacitive strips 5 that matches an inductance of said conducting structure 4. In other words, in manufacturing, inductance of said conductive structure 4 may be determined and further the capacitance of the capacitive strips may be matched to said inductance. They may be matched by using e.g. a model (e.g., a computer-implemented model) or a look-up-table that comprises data for matching capacitance values to inductance values. Further, the period 7 of said strips 5 and distance between outer edges 28 of said strips may be pre-determined to match a capacitance thereof to an inductance of said conducting structure 4. Further, to obtain this, a distance **28*d* between outer edges 28** of opposing capacitive strips may be equal to or less than a wavelength/3, $\lambda/3$ at a highest frequency of the first frequency band, preferably $\lambda/4$.

FIG. 1 illustrates the distance (may be referred to as edge distance) 28*d* between outer edges 28 in enlarged portion C.

Figure 2:
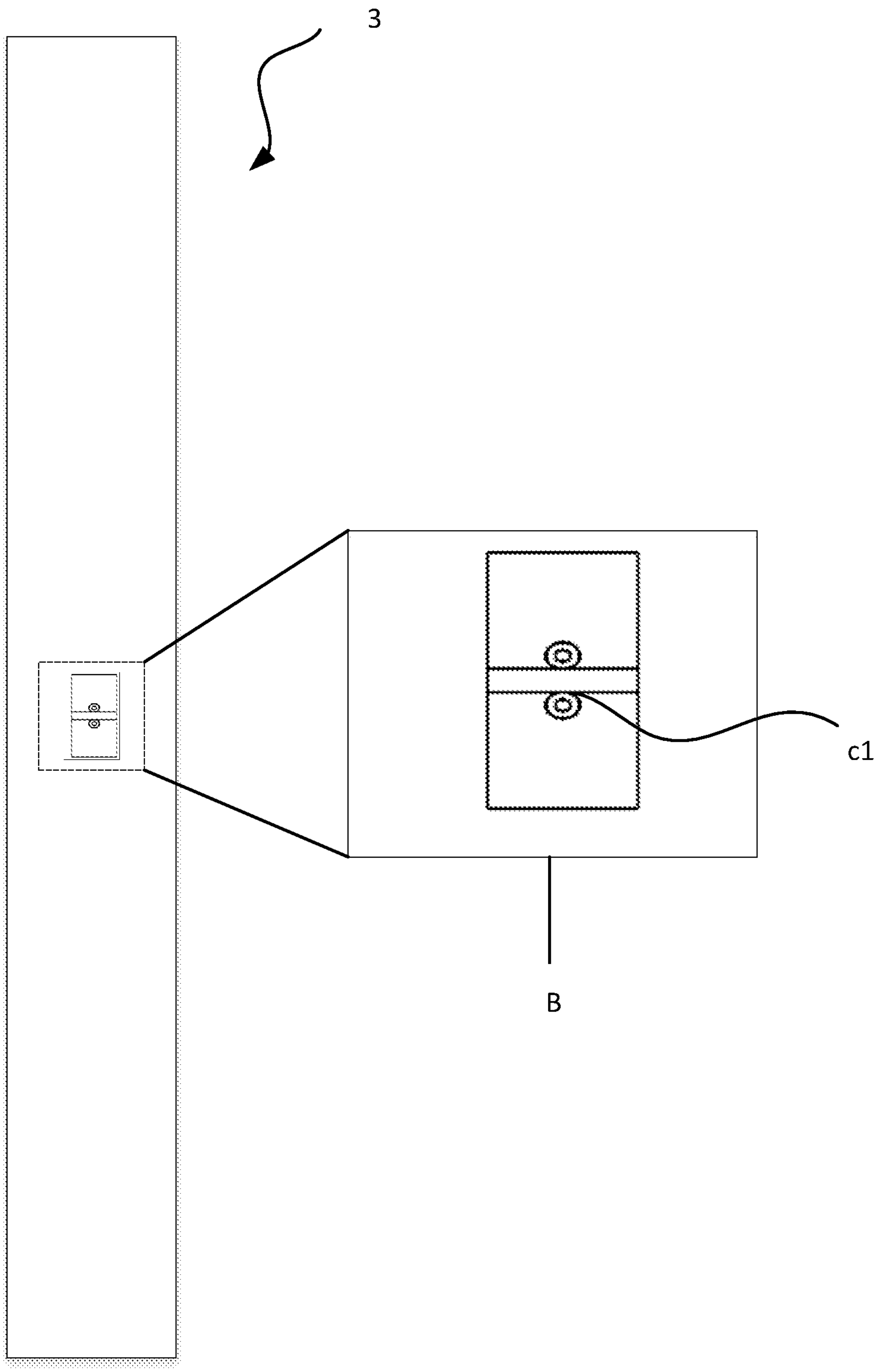
FIG. 2 illustrates a back-view of a planar layer in accordance with aspects of the present disclosure.

FIG. 2 illustrates a top back view of said planar layer 3. FIG. 2 shows that the feed portion c1 may extend through the layer 3 to the back of the layer 3 so that the conducting structure 4 (in the case it's a dipole) is fed from the back. The conducting structure 4 in case it's a second antenna may have a connection between the feed portion and an associated transmitter or receiver. B in FIG. 2 illustrates an enlarged view of said feed portion c1.

Figure 3:
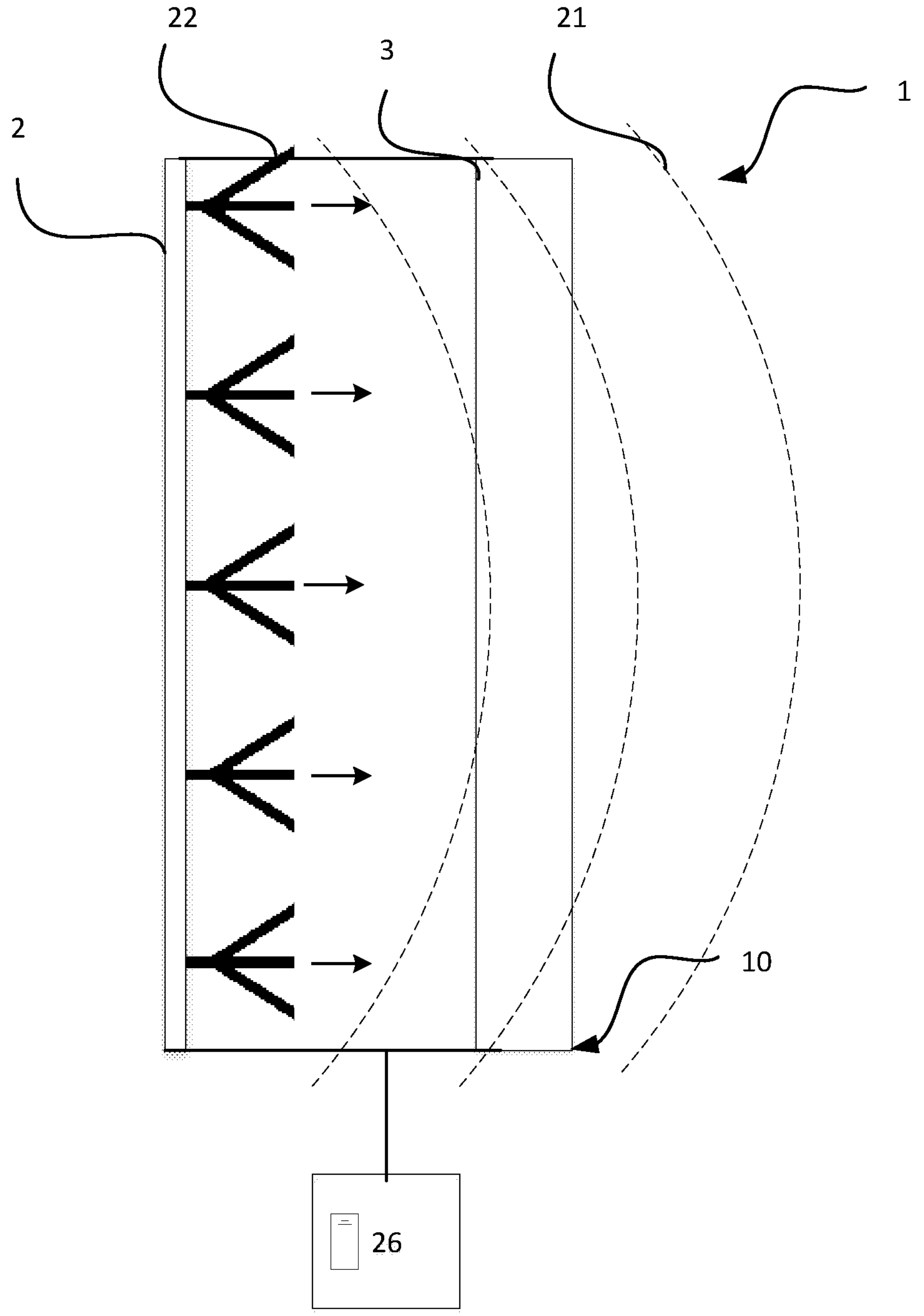
FIG. 3 schematically illustrates the antenna arrangement according to aspects of the present disclosure.

FIG. 3 illustrates a schematic view of an antenna arrangement 1, illustrating that the planar layer 3 (and consequently the conducting structure 4) is at least partly arranged within an illumination-field of the first antenna 2. FIG. 1 further shows that the first antenna 2 may be an antenna array comprising a plurality of antenna elements 22. The radiation 21 from the first antenna 2 traverses the conducting structure 4. The arrangement 1 of the first antenna 2 and the conducting structure 4 as seen in FIG. 1 allows for a compact arrangement that can be mounted to a fixed installation or a vehicle in a space efficient manner. The first antenna 2, and the conducting structure 4 are arranged such that the conducting structure 4 is in front of the first antenna 2. The first antenna 2 and the conducting structure 4 may be part of two different structures arranged together or may be part of a common structure. The antenna arrangement 1 may comprise one or more memory devices (not shown) and control circuitry 26. The memory device may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry. Each memory device may store any suitable instructions, data or information, including a computer program, software, an application including one or more of logic, rules, code, tables, etc. and/or other instructions capable of being executed by the control circuitry 26 and, utilized. In some embodiments, each control circuitry 26 and each memory device may be in the form of an integrated device The control circuitry 26 may include, for example, one or more central processing units (CPUs), graphics processing units (GPUs) dedicated to performing calculations, and/or other processing devices.

The instructions which may be executed by the control circuitry 26 may comprise instructions for operating said antenna arrangement 1 according to any aspects of the present disclosure. For example, if said conducting structure 4 is a second antenna, and the antenna arrangement 1 is a radar antenna arrangement, the control circuitry 26 may store instructions to operate the first and the second antenna 2, 4 so to detect, identify and characterize targets.

FIG. 3 further illustrates that wherein the first antenna 2 may be enclosed by a radome 10, wherein the radome 10 is formed by said planar layer 3. In some aspects the radome may be an additional layer stacked on said planar layer 3. Thus, the antenna arrangement 1 as such provides an improved space-efficiency/compactness. Moreover, FIG. 3 illustrates in more detail that the conducting structure 4 is at least partly arranged within an illumination-field of the first antenna 2. FIG. 3 illustrates that the radiation 21 from the first antenna 2 traverses the planar layer 3.

Figure 4A:
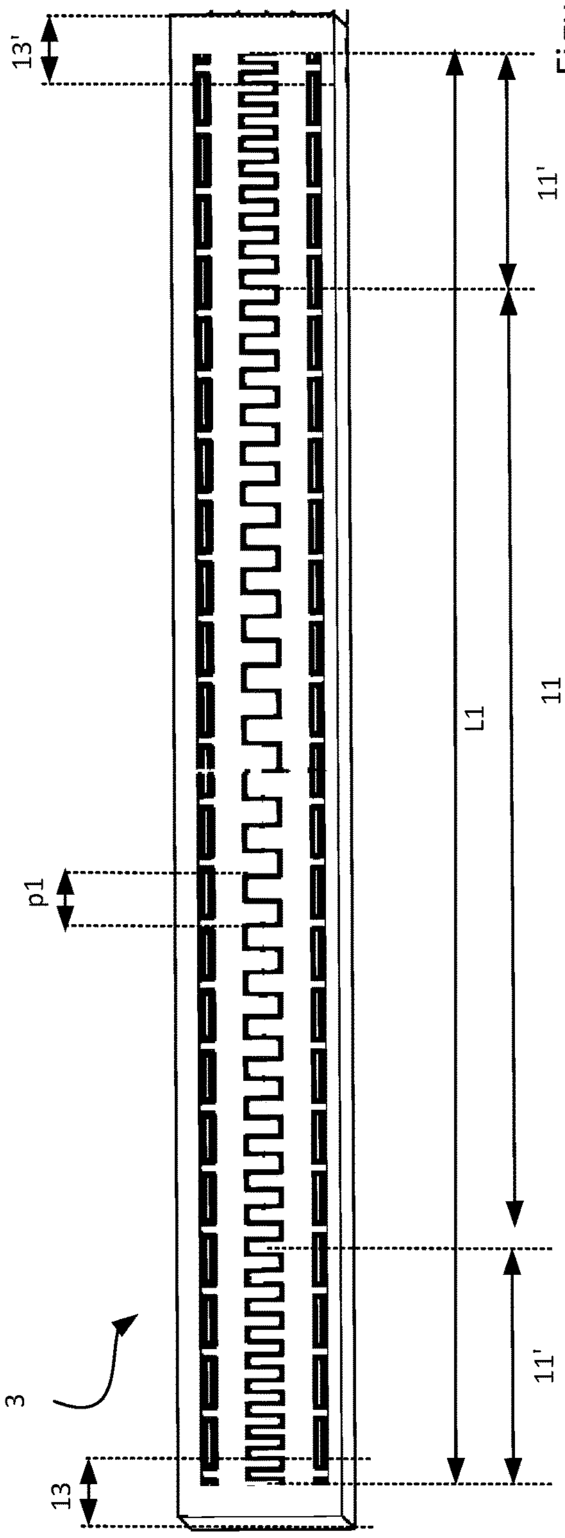
FIGS. 4A-4B illustrate from a top view the planar layer in accordance with different aspects of the present disclosure.

FIG. 4A illustrates a top view of a planar layer 3 where it is illustrated that the conductive structure 4 may be in the form of a meander line extending in a zigzag form, a square-waveform, a sinusoidal-waveform or a saw-tooth form. Further, as shown in FIG. 4A, the meander line 4 may be a tapered meander line 4, said meander line 4 comprising meander periods p1, the meander periods p1 at central portions 11 of said meander line 4 being greater than meander periods p1 at edge portions 11' of said meander line 4. In other words, the meander periods p1 at edge portions 11' have less extension along a length direction/axis (being parallel to the length of the conductive structure L1) compared to meander periods p1 at said central portions 11. Thus, the meander line is more dense at edge portions 11' than in central portions 11 as shown in FIGS. 4A-4B.

Figure 4B:
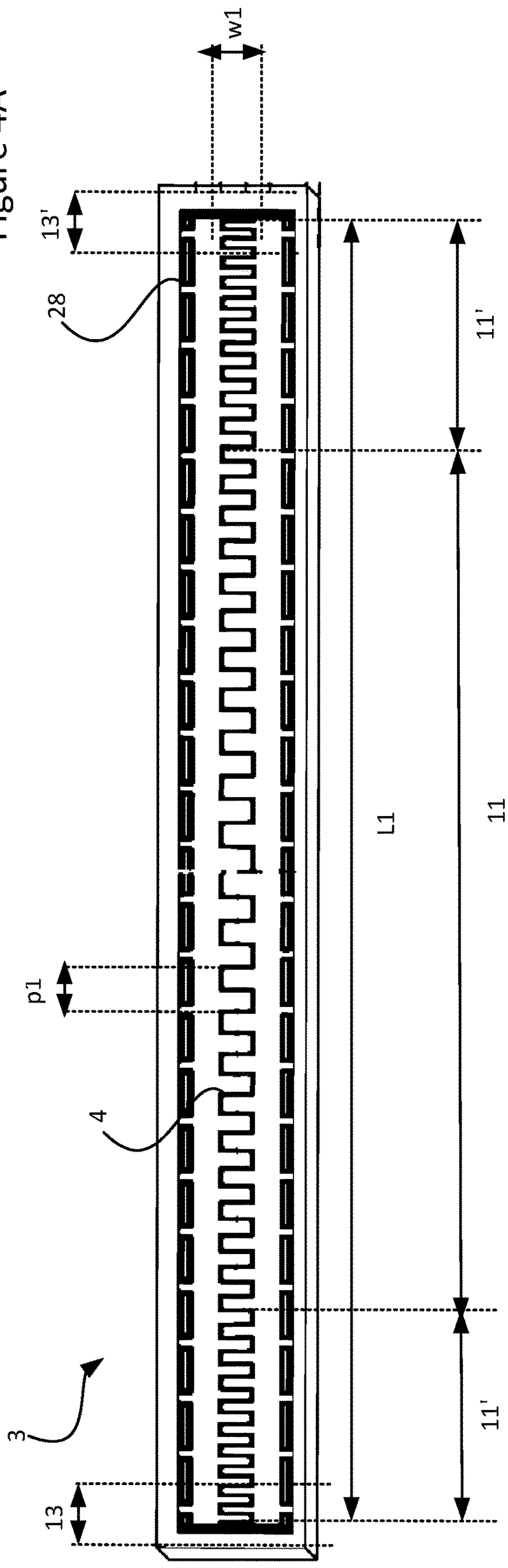

FIG. 4B illustrates a top view of a planar layer. FIG. 4B further illustrates that the plurality of capacitive strips 5 may be further arranged on opposing lateral portions 13, 13' of said planar layer 3, extending along a width w1 of said conducting structure 4. In other words, having a pair of additional capacitive strips 5 extending along a width w1 of said conducting structure 4 and being positioned at lateral portions of said planar layer. Accordingly, said capacitive strips 5 may surround the conductive structure 4 as shown in FIG. 4B. The width w1 may be between 1-10 mm. Moreover, a distance between outer edges 28 of said capacitive strips 5 may be determined to match their capacitance to the first antenna 2. Accordingly, the width w1 may be λ/3 of a frequency of the first antenna 2. FIG. 4B illustrates that the capacitive strips 5 at the lateral portions are in contact with said conducting structure 4.

Figure 5:
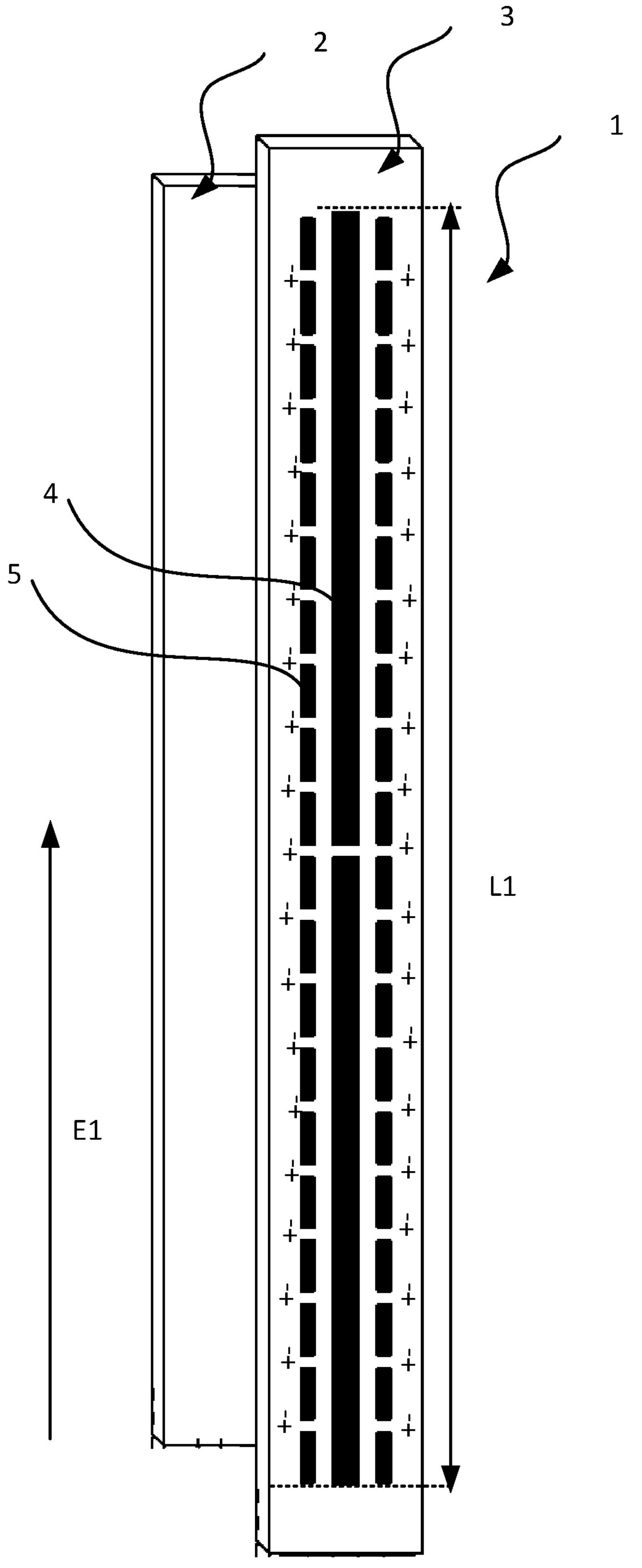
FIG. 5 illustrates a top view of an antenna arrangement in accordance with aspects of the present disclosure.

FIG. 5 schematically and exemplary illustrates a top view of said antenna arrangement 1. Further FIG. 5 illustrates an electric field E1 from the first antenna 2 (i.e. arising from radiation of said first antenna 2) coincides with said conducting structure 4. However, a capacitive effect of said capacitive strips 5 forms a resonance circuit together with the inductance of the conducting structure 4 allowing for cancellation of the scattering being provided by the conducting structure 4 or at least significantly reduced. Denotations +− in FIG. 5 illustrate the capacitive effect provided by said capacitive strips 5 which allows for cancellation of scattering when coinciding with the electromagnetic field from the first antenna 2, at normal incidence.

The antenna arrangement 1 may be arranged such that said length L1 of said conducting structure 4 is parallel to a polarization direction E1 of said first antenna 2. Thus, the propagation direction provided by the radiation 21 (as shown in FIG. 3) is perpendicular to said polarization direction.

Figure 6:
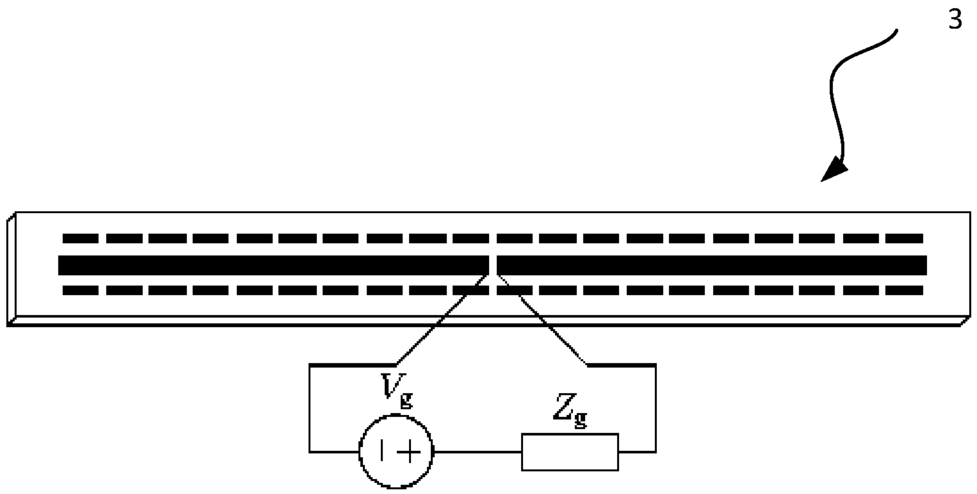
FIG. 6 illustrates a top view of a planar layer with schematics of a circuitry thereof, in accordance with aspects of the present disclosure.

FIG. 6 illustrates a schematic objective top view of said planar layer 3 in which circuitry is shown. The generator voltage Vg and generator impedance Zg comprises a Thévenin equivalent capable of representing any underlying feeding circuitry.

Figure 7A:
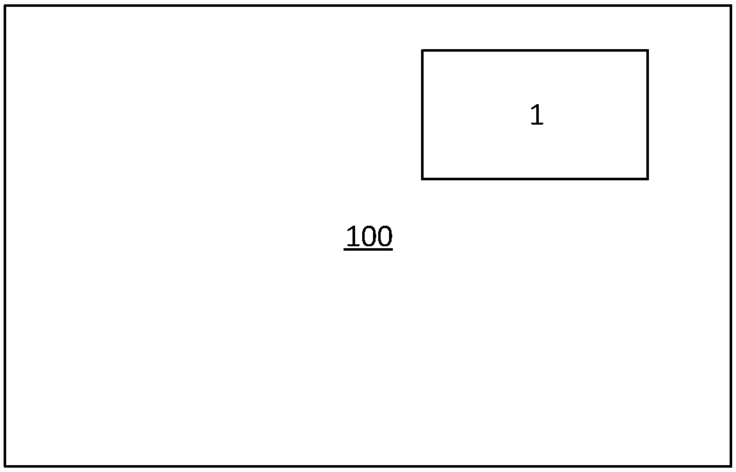
FIGS. 7A-7B illustrates schematically a vehicle and a fixed installation, respectively, comprising said antenna arrangement in accordance with aspects of the present disclosure.

FIG. 7A schematically illustrates a fixed installation 100 comprising the antenna arrangement 1 according to any aspect herein. The fixed installation may be a base station.

Figure 7B:
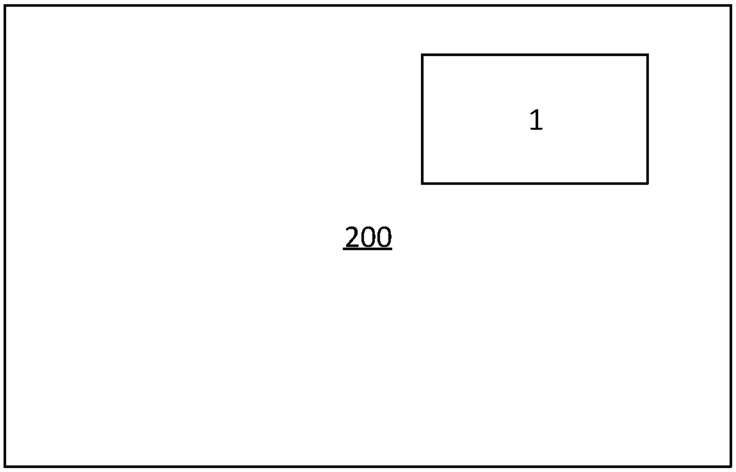

FIG. 7B schematically illustrates a vehicle 200 comprising the antenna arrangement 1 according to any aspect herein. The vehicle may be a ground-vehicle, air-borne vehicle or a ship.

Figure 8:
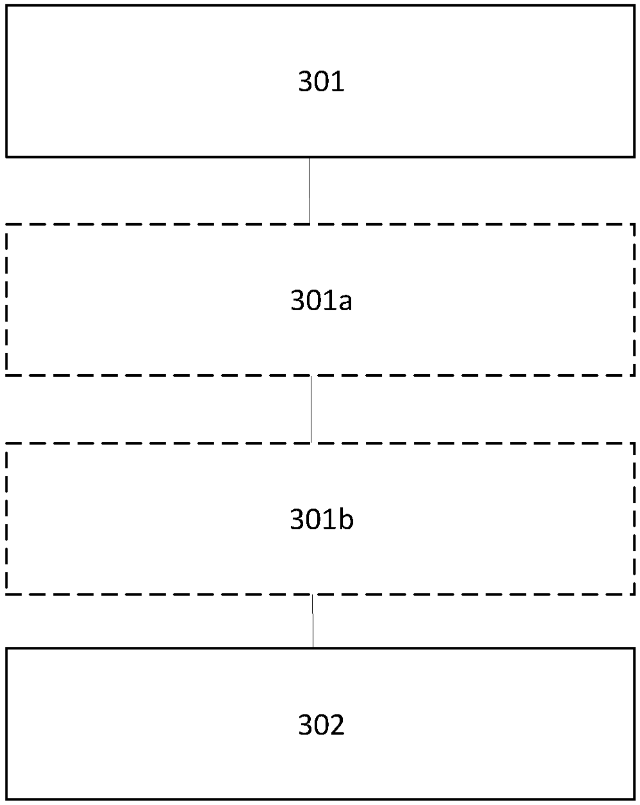
FIG. 8 illustrates a method of manufacturing a planar layer for the antenna arrangement according to any aspect of the present disclosure.

FIG. 8 illustrates in the form of a flowchart, a method 300 of manufacturing a planar layer for the antenna arrangement according to any aspect of the present disclosure. The method comprises the steps of:

providing 301 said planar layer having an oblong conducting structure attached thereon;

etching 302 a plurality of capacitive strips on opposing longitudinal portions of said conducting structure extending along said length of said conducting structure.

As further shown in FIG. 8, the method may additionally comprise the steps of, prior to the step of etching 302:

determining 301*a* a period (i.e. as denoted 7 in FIG. 1) for each capacitive strip of the plurality of capacitive strips. Further the method may comprise the step of determining 301*b* a distance between adjacent capacitive strips in the direction of the length of the conductive structure. The period and the distance being determined based on an inductance of said oblong conducting structure at said first frequency band of said first antenna.

Thus, the period may be determined to match a capacitance of the plurality of capacitive strips to an inductance of said conducting structure.

FIG. 9 illustrates a graph depicting a comparison of extinction cross section for a planar layer of an antenna arrangement of the present disclosure compared to a conventional antenna arrangement having a substrate with a conductive structure thereon being in the illumination field of a first antenna. FIG. 1 therefore illustrates a simulation in which the plot denoted Line 1 shows that a planar layer is in the illumination field of a first antenna (as shown in FIGS. 1 and 3). FIG. 9 illustrates with the plot denoted Line 1 that a 20 dB reduction of the extinction cross-section at a center frequency is provided compared to a conventional antenna arrangement indicated by line 2. Thus, the antenna arrangement of the present disclosure significantly reduces scattering/disturbance of the conductive structure to the function of the first antenna. It should be noted that the graph is merely for disclosing purposes to show advantages accompanied with the disclosure and is not in any manner limiting the present disclosure or scope thereof.

The invention claimed is:

1. An antenna arrangement comprising:

a first antenna configured to operate within a first frequency band;

a planar layer having an oblong conducting structure attached thereon, wherein the conducting structure is arranged within an illumination-field of the first antenna; and a plurality of capacitive strips arranged on opposing longitudinal portions of the planar layer extending along a length of the conducting structure, the longitudinal portions is separated by the conducting structure.

2. The antenna arrangement according to claim 1, wherein the conducting structure is a wire structure, the wire structure is one of a lightning protection wire, electrical cable, transmission line and a pitot tube.

3. The antenna arrangement according to claim 1, wherein the conducting structure is a dipole antenna element, preferably a half-wavelength dipole antenna element with a centre feed point, the dipole antenna element configured to operate within a second frequency band, wherein the first frequency band is greater than the second frequency band.

4. The antenna arrangement according to claim 3, wherein a lowest frequency of the first frequency band is at least two times greater than a highest frequency of the second frequency band.

5. The antenna arrangement according to claim 1, wherein the length of the conducting structure is parallel to a polarization direction of the first antenna.

6. The antenna arrangement according to claim 1, wherein a distance between outer edges of opposing capacitive strips is equal to or less than a wavelength/3 (λ/3), at a highest frequency of the first frequency band, preferably λ/4.

7. The antenna arrangement according to claim 1, wherein the conductive structure is in the form of a meander line extending in a zigzag form, a square-waveform, a sinusoidal-waveform or a saw-tooth form.

8. The antenna arrangement according to claim 7, wherein the meander line is a tapered meander line, the meander line comprising meander periods, the meander periods at central portions of the meander line are greater than meander periods at edge portions of the meander line.

9. The antenna arrangement according to claim 1, wherein the planar layer has a thickness being equal to or smaller than wavelength/5 (λ/5), at a highest frequency of the first frequency band.

10. The antenna arrangement according to claim 1, wherein the plurality of capacitive strips are further arranged on opposing lateral portions of the planar layer, extending along a width of the conducting structure.

11. The antenna arrangement according to claim 1, wherein each capacitive strip of the plurality of capacitive strips comprises a pre-configured period, the period defined by a sum of a strip-length of one of the capacitive strips of the plurality of capacitive strips and a strip-gap between a first edge of the capacitive strip to an adjacent second edge of an adjacent capacitive strip;

wherein the period is pre-arranged to provide a capacitance of the plurality of capacitive strips that matches an inductance of the conducting structure.

12. The antenna arrangement according to claim 1, wherein the first antenna is enclosed by a radome, wherein the radome is formed by the planar layer.

13. A fixed installation comprising an antenna arrangement according to claim 1.

14. A vehicle comprising an antenna arrangement according to claim 1.

15. A method of manufacturing a planar layer for the antenna arrangement according to claim 1, comprising the steps of:

providing the planar layer having an oblong conducting structure attached thereon;

etching a plurality of capacitive strips on opposing longitudinal portions of the conducting structure extending along the length of the conducting structure.

16. The method according to claim 15, further comprising the step of, prior to the step of etching:

determining a period for each capacitive strip of the plurality of capacitive strips;

determining a distance between adjacent capacitive strips in the direction of the length; and wherein the period and the distance are determined based on an inductance of the oblong conducting structure at the first frequency band of the first antenna.

* * * * *